United States Patent
Reibel (10) Patent No.: US 9,728,072 B2
(45) Date of Patent: Aug. 8, 2017

(54) METHOD FOR DETECTING, RECOGNIZING, AND AUTOMATIC DISARMING OF AN ALARM CONTROL UNIT, AND ALARM SYSTEM SUITABLE FOR ITS USE

(71) Applicant: RADIO SYSTEMES INGENIERIE VIDEO TECHNOLOGIES, Strasbourg (FR)

(72) Inventor: Jean-Michel Reibel, Lampertheim (FR)

(73) Assignee: RADIO SYSTEMES INGENIERIE VIDEO TECHNOLOGIES, Strasbourg (FR)

( * ) Notice: Subject to any disclaimer, the term of this patent is extended or adjusted under 35 U.S.C. 154(b) by 0 days.

(21) Appl. No.: 14/923,805

(22) Filed: Oct. 27, 2015

(65) Prior Publication Data

US 2016/0133120 A1     May 12, 2016

(30) Foreign Application Priority Data

Oct. 29, 2014  (FR) ..................................... 14 60378

(51) Int. Cl.
G08B 25/00     (2006.01)
G07C 9/00      (2006.01)
(Continued)

(52) U.S. Cl.
CPC ....... G08B 25/008 (2013.01); G07C 9/00103 (2013.01); H04W 4/008 (2013.01); G08B 29/181 (2013.01)

(58) Field of Classification Search
CPC .... G08B 25/00; G08B 25/007; G08B 25/008; G08B 25/009; G08B 25/10
See application file for complete search history.

(56) References Cited

U.S. PATENT DOCUMENTS 4,647,914 A * 3/1987 Alexander ............. G08B 19/00
                                                340/506
5,594,428 A * 1/1997 Peterson ............. G07C 9/00309
                                                340/12.22
(Continued)

FOREIGN PATENT DOCUMENTS

EP    2 287 812 A1    2/2011
WO    2008/031191 A1   3/2008

OTHER PUBLICATIONS

FR Search Report, dated Jun. 19, 2015, from corresponding FR application.

*Primary Examiner* — Van Trieu
(74) *Attorney, Agent, or Firm* — Young & Thompson (57) ABSTRACT

A method and system for detecting, recognizing, and automatic disarming of an alarm control unit (3) for monitoring a secure space that is closed by at least one door, the system including the control unit (3), at least one autonomous detection and identification assembly including a proximity transmitter/receiver (4b) and at least one detection sensor (5b) making it possible to detect an opening of the door and/or a passage through the latter, and at least one active wireless communication portable medium (6) including an identification code. The method includes, following detection, in the armed state of the control unit, controlling the activation of the transmitter/receiver to activate it, then to deactivate it, after a predetermined time t0, to put it on standby and, in the disarmed state, to keep it on standby.

15 Claims, 4 Drawing Sheets

(51) Int. Cl.
*H04W 4/00* (2009.01)
*G08B 29/18* (2006.01)

(56) References Cited

U.S. PATENT DOCUMENTS

| | | | |
|---|---|---|---|
| 7,696,873 B2 * | 4/2010 | Sharma | G08B 25/008 340/425.5 |
| 2008/0143499 A1 * | 6/2008 | Shimomura | B60R 25/1003 340/426.28 |
| 2009/0289793 A1 | 11/2009 | Morin | |
| 2011/0016971 A1 * | 1/2011 | Yulkowski | E05F 15/40 73/493 |
| 2011/0043362 A1 | 2/2011 | Reibel | |

\* cited by examiner

METHOD FOR DETECTING, RECOGNIZING, AND AUTOMATIC DISARMING OF AN ALARM CONTROL UNIT, AND ALARM SYSTEM SUITABLE FOR ITS USE

BACKGROUND OF THE INVENTION

Field of the Invention

This invention relates to the field of alarms that make possible the surveillance of secure spaces located in buildings or structures, and has as its object a method for detecting, recognizing, and automatic disarming of an alarm control unit and an alarm system suitable for using said method.

Description of the Related Art

Alarm systems are already known that comprise an alarm control unit powered by an autonomous energy source or by the electric network and connected by wire or wirelessly (radio frequency) to at least one badge reader located in the area of a door. The reader generally has a keypad to enable the entering of a personal identification code intended to be authenticated by the control unit by being compared to a list of authorized identification codes stored in the latter.

When the code is recognized by the alarm control unit, the system controls the procedure for disarming the alarm control unit that consists in performing several operations such as, for example: indicating to certain elements of the system the change in status, modifying the signaling of the indicator lights that go, for example, from red to green, displaying a message on the screen of the keypad, communicating with a remote monitoring center, or else recording the event in the system log. When the identification code is not recognized by the control unit, it then generates an alarm procedure that generally consists in triggering a sound alarm and/or an alarm in the form of a response procedure directly at the secure site or remotely.

Such systems generally comprise a manual arming means such as a key or a code that enables the user to arm the control unit when he leaves the secure space.

Other alarm systems are also known that avoid the user entering a code using the button keypad of the reader, by inserting or by sliding an individual badge, which contains in its memory an identification code, into a slot that is specially provided in the reader or by presenting a contactless badge or transponder badge in the vicinity of the reader.

The contactless badge reader is commonly called a proximity reader and is designed to communicate, using a proximity transmitter/receiver, with the transponder badge by radiofrequency and to transmit an interrogation signal in the direction of said transponder badge, located in its communication field, i.e., its emission field, at a suitable distance. The transponder badge, after having received the interrogation signal coming from the reader, is designed to be able to transmit in return an identification signal destined for the proximity reader by using the energy contained in the interrogation signal.

Subsequently, the proximity reader, using a communication module, transmits the identification signal to the alarm control unit that generates an alarm procedure, such as the one described previously, if the identification signal is not authenticated and validated by the control unit.

Such technology for remotely reading a transponder badge is well known under the name of RFID technology, an abbreviation for the English term "Radio Frequency Identification." This type of badge is of the "passive" type, i.e., it does not comprise a power source.

However, this technology requires significant power to obtain an effective covering zone for the proximity reader. Actually, the proximity reader must be permanently or periodically activated to be in service when a transponder badge is near, in its transmit field, with a more or less short reaction time, depending on the application. The proximity reader must therefore be connected to a power source that is permanent and consistent, particularly of the public power grid type.

In addition, the power consumption of the proximity reader is not restricted to its exchanges with transponder badges but can also result from various communications between said proximity reader and the alarm control unit.

The electric power consumption of the proximity reader is therefore a crucial problem when it must be rendered autonomous, with its own power source, this in order to avoid any electrical wiring of the proximity reader, particularly with an external power supply of the public power grid type, and to make possible an easy installation of said proximity reader at strategic locations, particularly in the area of a door for access to a secure space that is alarmed and/or under anti-intrusion monitoring or in the immediate vicinity of the latter by means of an alarm control unit.

To eliminate this problem, the document EP2287812 describes a device for detecting entry into a secure space of a dwelling and for recognizing transponder badges intended to work with an alarm control unit and/or an anti-intrusion monitoring system. The device comprises a proximity reader that is capable of communicating with the transponder badges and that is located in the secure space in the immediate vicinity of the access opening. The reader further incorporates an autonomous electric power supply source, and the device further comprises an assembly of means for detecting entry or passage through the access opening and means that are able, during an entry detection, to automatically control the activation of said proximity reader and the putting of the latter in communication with the control unit and with the transponder badge present, this for the purpose of establishing a transfer of data within the context of a procedure for identifying and recognizing the transponder badge in question, and then, if no authorized badge is recognized and so that an entry detection is effective, within the context of an alarm and/or response procedure by said control unit.

However, if the device of the document EP2287812 provides a standby for the remote identification reader that saves energy intended to activate it when no entry or door opening has been detected, once the system has been disarmed by a person who is identified and authorized to enter, the reader, in the disarmed mode of the control unit, continues to be activated by each detection of a new entry or door opening. Thus, for example in the case of a garage in a house whose door is protected by such a system, the opening of the door several times a day, when the system is disarmed, causes the reader, which is autonomous, to activate as many times, following each detection of opening of the door by the detector, and therefore a power consumption by the reader that is too high does not enable an autonomous operation of long duration.

SUMMARY OF THE INVENTION

This invention has as its object to eliminate these drawbacks by proposing a method for identifying, recognizing, and automatic disarming of an alarm control unit making it possible to limit the power consumption of the autonomous elements of the system suitable for its use.

In this regard, this invention has as its object a method for detecting, recognizing, and automatic disarming of an alarm control unit for monitoring a secure space comprising at least one access opening that is closed by a door, using an alarm system comprising, on the one hand, the alarm control unit that comprises a main central processing unit, and a main communication module is supplied by an autonomous main power source or by the grid; on the other hand, at least one autonomous detection and identification assembly that is connected operationally to the control unit and that is associated with the door or with one of the doors, the or each assembly comprising one or two secondary central processing units, a proximity transmitter/receiver capable of being activated or put on standby, at least one detection sensor able to detect an opening of the associated door and/or a passage through the latter, one or two secondary communication modules making possible the communication with the control unit and one or two secondary power sources making possible the power autonomy of the or of each assembly; and still on the other hand, at least one active wireless communication portable medium comprising a wireless communication chip, such as a Bluetooth chip preferably of low power, and a memory containing an identifier, the or each activated proximity transmitter/receiver being able to establish a wireless communication with the or each chip to make possible the identification of the portable medium and the recognition of its identifier by the control unit that is designed, depending on whether the identifier is recognized or not, automatically to be disarmed or to trigger an alarm procedure.

According to the invention, by "active" in "active wireless portable communication medium" will be meant a wireless portable communication medium containing its own power source that makes possible its power supply for its operation.

Such a method is characterized essentially in that, based on a configuration where the or each proximity transmitter/receiver is in standby mode and where the control unit is in the armed or disarmed state, for the or each door in question, it consists in performing the following consecutive steps:

a/ automatically detecting, using the detection sensor(s), an opening of the door and/or a passage through the latter, b/ following said detection, depending on the arming state, armed or disarmed, of the control unit:

in the armed state:

i/ controlling the activation of the proximity transmitter/receiver in question to put it automatically in the activated state enabling it to communicate wirelessly with the medium in question over a predetermined time t0, ii/ in the presence of the portable medium or one of the portable media in the radio frequency communication field of the activated proximity transmitter/receiver, establishing the corresponding wireless communication to make possible the identification of the portable medium in question, iii/ transmitting the identifier of the portable medium that is thus present to the control unit that, depending on the recognition status of the identifier, performs either, when it is valid, the procedure for disarming the system or, in the absence of a valid identifier, the alarm procedure, optionally after an entry timing delay, iv/ in the absence of a recognized medium, controlling, at the expiration of the predetermined time t0, the deactivation of the thus activated proximity transmitter/receiver to put it automatically in the standby state.

in the disarmed state:

v/ automatically keeping the proximity transmitter/receiver in the standby state by acting directly or indirectly on the latter.

This invention also has as its object an alarm system, suitable for using the method, according to this invention, for identifying, recognizing, and automatic disarming of an alarm control unit, for the monitoring of a secure space comprising at least one access opening that is closed by a door, characterized in that it comprises:

the alarm control unit that comprises a main central processing unit and a main communication module and is supplied by an autonomous main power source or by the grid, at least one autonomous detection and identification assembly that is connected operationally to the control unit and that is associated with the door or with one of the doors, the or each assembly comprising one or two secondary central processing units, a proximity transmitter/receiver capable of being activated or put on standby, at least one detection sensor able to detect an opening of the associated door and/or a passage through the latter, if applicable the or each detection sensor being capable of being automatically activated or put on standby, one or two secondary communication modules making possible the communication with the control unit and one or two secondary power sources making possible the power autonomy of the or of each assembly, at least one active wireless portable communication medium comprising a wireless communication chip, such as a Bluetooth chip preferably of low power, and a memory containing an identifier, the or each activated proximity transmitter/receiver being able to establish a wireless communication with the or each communication chip to make possible the identification of the portable medium and the recognition of its identifier by the control unit that is designed, depending on whether the identifier is recognized or not, automatically to be disarmed or to trigger an alarm procedure, and wherein the control unit or, if applicable, the or each assembly, is designed, following the detection by the detection sensor(s), on the one hand, in the armed state of the control unit, automatically to make it possible to control the activation of the proximity transmitter/receiver in question, as defined in step b/ i/ of the method according to the invention, and, on the other hand, in the disarmed state of the control unit, automatically to make it possible to keep, as defined in step b/ v/ of said method, the or each proximity transmitter/receiver in the standby state by acting directly or indirectly on the latter, and the or each assembly comprises time-delay means that make it possible to control automatically, after the predetermined time t0, the deactivation as defined in step b/ iv/ of said method.

BRIEF DESCRIPTION OF THE DRAWINGS

The invention will be better understood, using the following description, which relates to a preferred embodiment, given by way of nonlimiting example, and explained with reference to the accompanying diagrammatic drawings, in which.

DETAILED DESCRIPTION OF THE INVENTION

The figures show an alarm system suitable for using the method according to this invention, for identifying, recognizing, and disarming an alarm control unit 3, for monitoring a secure space 1 comprising at least one access opening that is closed by a door 2.

Such an alarm system comprises:

the alarm control unit 3 that comprises a main central processing unit 3a and a main communication module 3b and is supplied by an autonomous main power source 3c or by the grid, at least one autonomous detection and identification assembly that is connected operationally to the control unit 3 and that is associated with the door or with one of the doors 2, the or each assembly comprising one or two secondary central processing units 7a, 7b (FIG. 2), 7c (FIG. 3), a proximity transmitter/receiver 4a (FIG. 2), 4b (FIG. 3) capable of being activated or put on standby, at least one detection sensor 5a (FIG. 2), 5b (FIG. 3) able to detect an opening of the associated door 2 and/or a passage through the latter, if applicable the or each detection sensor 5a, 5b being capable of being automatically activated or put on standby, one or two secondary communication modules 8a, 8b (FIG. 2), 8c (FIG. 3) making possible the communication with the control unit 3 and one or two secondary power sources 9a, 9b (FIG. 2), 9c (FIG. 3) making possible the power autonomy of the or of each assembly, at least one active wireless communication portable medium 6 comprising a wireless communication chip, such as a Bluetooth chip preferably of low power, and a memory containing an identifier, the or each activated transmitter/receiver 4a, 4b being able to establish a wireless communication with the or each communication chip to make possible the identification of the portable medium 6 and the recognition of its identifier by the control unit 3 that is designed, depending on whether the identifier is recognized or not, automatically to be disarmed or to trigger an alarm procedure.

According to this invention, the control unit 3 or, if applicable, the or each assembly, is designed, following the detection by the detection sensor(s) 5a, 5b, on the one hand, in the armed state of the control unit 3, automatically to make it possible to control the activation of the proximity transmitter/receiver 4a, 4b in question, as defined in step b/ i/ of the method according to the invention (cf. p. 5, L. 21-23), and, on the other hand, in the disarmed state of the control unit 3, automatically to make it possible to keep, as defined in step b/ v/ of the method according to the invention (cf. p. 6, L. 13-14), the or each proximity transmitter/receiver 4a, 4b in the standby state by acting directly or indirectly on the latter.

Still according to this invention, the or each assembly comprises time-delay means that make it possible to control automatically, after the predetermined time t0, the deactivation as defined in step b/ iv/ of the method according to the invention (cf. p. 6, L. 9-12).

The main communication module 3b of the alarm control unit 3 can be designed to be able to communicate wirelessly by radio frequency, if applicable through wire, with the secondary communication module(s) 8a, 8b, 8c. For this purpose, the or each secondary communication module 8a, 8b, 8c can be designed to be able to communicate wirelessly by radio frequency, if applicable through wire, with the main communication module 3b.

It will be understood that, in the or each assembly of such a system, the detection sensor(s) 5a, 5b of the or of each assembly can be connected operationally to the or one of the secondary central processing units 7a, 7b, 7c of the same corresponding assembly.

The method, according to this invention, for detecting, recognizing, and automatic disarming of the alarm control unit 3 for monitoring the secure space 1, based on such a system, using a configuration where the or each proximity transmitter/receiver 4a, 4b is on standby and where the control unit 3 is in the armed or disarmed state, for the or each door 2 in question, consists in performing the following consecutive steps a/ and b/:

a/ automatically detecting, based on the detection sensor (s) 5a, 5b, an opening of the door 2 and/or a passage through the latter, b/ following said detection, depending on the arming state, armed or disarmed, of the control unit 3:

in the armed state:

i/ controlling the activation of the proximity transmitter/receiver 4a, 4b in question to put it automatically in the activated state enabling it to communicate wirelessly with the portable medium 6 in question over a predetermined time t0, ii/ in the presence of the portable medium or one of the portable media 6 in the radio frequency communication field of the activated proximity transmitter/receiver 4a, 4b, establishing the corresponding wireless communication to make possible the identification of the portable medium 6 in question, iii/ transmitting the identifier of the portable medium 6 that is thus present to the control unit 3 that, depending on the recognition status of the identifier, performs either, when it is valid, the procedure for disarming the system or, in the absence of a valid identifier, the alarm procedure, optionally after an entry timing delay, iv/ in the absence of a recognized portable medium 6, controlling, at the expiration of the predetermined time t0, the deactivation of the thus activated proximity transmitter/receiver 4a, 4b to put it automatically in the standby state.

in the disarmed state:

v/ automatically keeping the proximity transmitter/receiver 4a, 4b in the standby state by acting directly or indirectly on the latter.

In a first embodiment of the method relating to the activation of the reader 4 of the or of each assembly in question, said method, based on the system (FIGS. 1 and 3) where, on the one hand, the or each assembly can consist of a detector/reader 4, 5 that can incorporate the secondary central processing unit 7c, the secondary wireless communication module 8c, the proximity transmitter/receiver 4b, the detection sensor(s) 5b and the secondary power source 9c, the secondary central processing unit 7c of the or of each assembly that can be designed to be able to control, following a detection by the detection sensor(s) 5b, the activation of the proximity transmitter/receiver 4b of the same assembly, and, on the other hand, the main central processing unit 3a of the control unit 3 can be designed to send to the secondary central processing unit 7c of the or of each assembly an information signal representing or reflecting the arming state, i.e., the armed or disarmed state, of the control unit 3, can consist:

prior to step b/, in sending to the secondary central processing unit 7c of the or of each detector/reader 4, 5, the information signal representing the arming state of the control unit 3 to inform it of the arming state of the control unit 3, in step b/ i/, in controlling from the secondary central processing unit 7c the activation of the transmitter/receiver 4b.

In a second embodiment of the method relating to the activation of the reader 4 of the or of each assembly in question, said method, based on the system (FIG. 2) where the main central processing unit 3a of the control unit 3 can be designed to be able to control the activation of the proximity transmitter/receiver 4a of the or of each assembly and where the or each assembly can consist, on the one hand, of a reader 4 that can incorporate the proximity transmitter/receiver 4a, one of the two secondary central processing units 7a, one of the two secondary communication modules 8a and one of the two secondary power sources 9a and, on the other hand, of a detector 5 that can incorporate the other secondary central processing unit 7b, the other secondary communication module 8b, the detection sensor(s) 5a and the other secondary power source 9b, can consist:

in step a/, in sending to the control unit 3, from the detector 5, a signal representing the detection performed by the detection sensor(s) 5a of said detector 5, in step b/ i/, in controlling, from the control unit 3, the activation of the proximity transmitter/receiver 4a.

In a preferred embodiment of the method relating to the deactivation of the activated reader 4 of the or of each assembly in question, it can consist in step b/ iv/ in controlling the deactivation of the transmitter/receiver 4a, 4b from the or one of the secondary central processing units 7a, 7c of the same assembly.

Furthermore, the control unit 3 can comprise a memory containing the list of valid identifiers relative to the portable media 6.

On the other hand, in a preferred embodiment of the method to detect the presence of possible portable media forgotten in the secure space after having proceeded to the arming of the control unit 3 in the armed state, the method can, using the system, in response to the arming of the control unit 3 in the armed state, prior to step a/, consist in controlling the activation of the transmitter/receiver 4a, 4b of the or of each assembly, automatically to put the or each transmitter/receiver 4a, 4b in the activated state for a predetermined period so as to detect the possible presence of a portable medium 6 that is authorized in the secure space 1, then in controlling, after a predetermined period, the deactivation of the or of each activated transmitter/receiver 4a, 4b so as to put it (them) in a standby state, and in that it consists, in the case of such a presence, in temporarily suppressing the portable medium 6 in the list of valid identifiers stored in the control unit 3 until it is next disarmed. Controlling the deactivation, in this prior step following the arming, automatic or manual, of the alarm control unit 3, can be performed from the control unit 3 by means of its main central processing unit 3a, via the main communication module 3b.

Figure 4A:
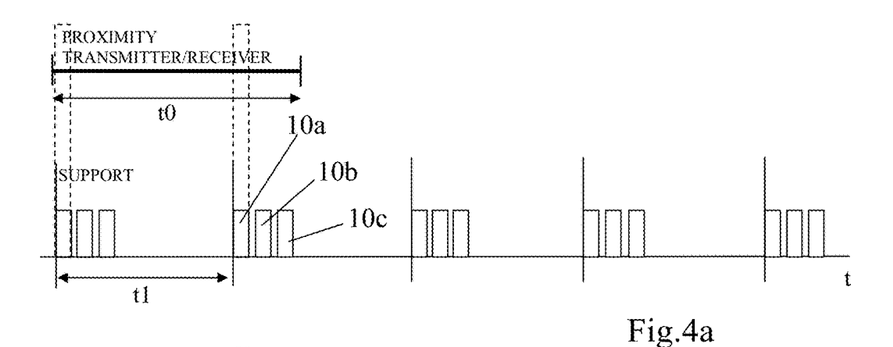
FIG. 4a shows a diagram of the times that cause the periodic cycle of the broadcasts by the portable medium or portable media of the signaling message to appear indicating their presence and the predetermined activation time, following the detection of an opening of the door and/or of a passage through the latter, of the or of each proximity transmitter/receiver in question, in a preferred embodiment with a series of three consecutive transmission channels and a use of the first transmission channel of said series by the or each proximity transmitter/receiver in question.
Figure 4B:
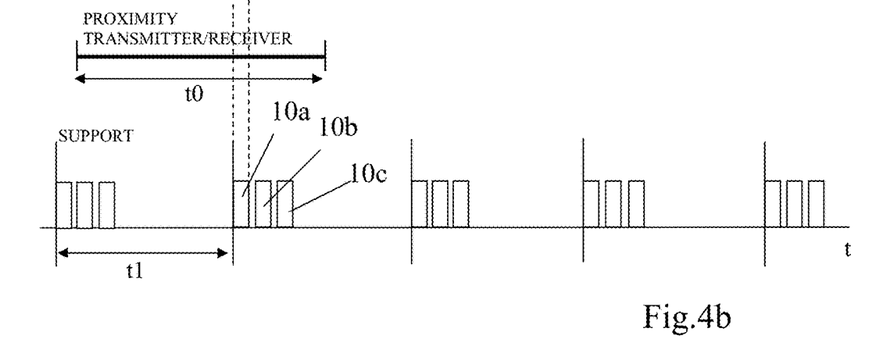
FIG. 4b shows the diagram of FIG. 4a with a time phase shift between the proximity transmitter/receiver and the portable medium in the communication field between the latter.
Figure 4C:
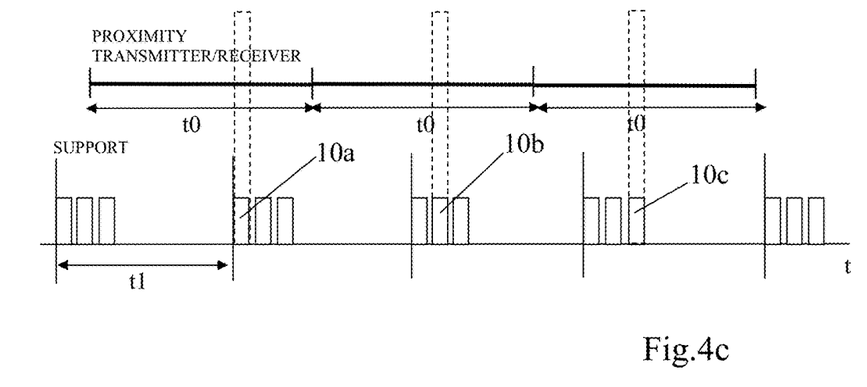
FIG. 4c shows the diagram of FIG. 4a with a consecutive use of the three transmission channels by the or each proximity transmitter/receiver in question repeating three times their predetermined activation time t0.

If reference is now made to FIGS. 4a, 4b, 4c, it can be seen that the method can, in the armed state and in the activated state of the or of each proximity transmitter/receiver 4a, 4b, using the or each portable medium 6 designed to transmit periodically, according to a predetermined timing with a cycle of time t1, a signaling message indicating its presence, said signaling message being transmitted for each cycle on one or more transmitting channels 10 each repeating said message, preferably three channels 10a, 10b, 10c, the use of the or of each transmitting channel 10a, 10b, 10c by the or each proximity transmitter/receiver 4a, 4b being performed over the predetermined time t0, consist:

in defining the predetermined time t0 of the activated state of the or of each proximity transmitter/receiver 4a, 4b in relation to the time t1 of the cycle so that the predetermined time t0 is strictly greater than the time t1 of the cycle.

Preferably, the process can, in the case where the signaling message is transmitted on at least two transmitting channels 10 that are used consecutively in a predetermined order by the or each proximity transmitter/receiver 4a, 4b and where no communication has been established in the first transmitting channel 10a used, consist in using consecutively the other transmitting channel(s) 10b, 10c until a communication is established or until the last transmitting channel 10c has been used by the or each proximity transmitter/receiver 4a, 4b (FIG. 4c).

Thus, it will be understood that if in theory a predetermined time t0 of the activation of the or of each proximity transmitter/receiver 4a, 4b could be enough to initiate a communication, it is, however, possible that the transmitting channel 10a, 10b, 10c used by the latter is jammed, for example by other users of the radio frequency band of said transmitting channel. In this case, this invention, as seen previously, can thus make it possible for the or each proximity transmitter/receiver 4a, 4b to be able to continue its activation time t0 by reproducing it at each consecutive use, if applicable, of another transmitting channel (FIG. 4c). On the other hand, it will be noted that by observing the signal level on the transmitting channels 10a, 10b, 10c and by keeping track of the transmitting channels exhibiting the most success for establishing communications, the or each proximity transmitter/receiver 4a, 4b in question can be configured to prioritize the order in which it will listen for the transmitting channels 10a, 10b, 10c to reduce the probability of jamming that can introduce a delay in the establishment of the communication between the latter and the portable media 6 in question.

Thus, more particularly, the or each portable medium 6 can transmit at any time, according to a predetermined timing, a signaling message indicating its presence. The timing can be defined so that the time of the cycle t1 is, preferably, greater than 0.7 second and less than 5 seconds. Actually, tests performed by this applicant have shown that for a time of the cycle t1 that is less than or equal to 0.7 second, the timing of the signaling becomes so fast that the resulting consumption of energy exceeds 500 mAh per year of operation, which can exceed the capabilities of the power source of the or of each portable medium 6. These tests have also shown that for a time of the cycle t1 that is greater than or equal to 5 seconds, the response time of the system becomes very long, bearing in mind that the total activation time of the or of each proximity transmitter/receiver 4a, 4b in the case of a plurality of transmitting channels, three transmitting channels is a multiple of t0, for example in the case of three channels is equal to three times the predetermined time t0 (FIG. 4c). And it will be recalled that in numerous alarm systems, the time delay during which a person is admitted into the secure area before the alarm is triggered is fixed at about 30 seconds, which is deemed sufficient to deactivate the alarm system, for example by entering a code or by presenting a badge such as a portable medium 6. Ideally, the time t1 of the cycle can be between 1.5 and 3 seconds, so as preferably to provide for an interval of values of t1 that makes it possible to obtain the best compromise of responsiveness/energy savings.

The predetermined time t0 can, for example, be preferably between 1.7 and 4.5 seconds, more preferably to be equal to about 1.7 seconds. It will be noted that with an activation time t0 that is significantly greater than the time t1 of the transmission cycle, it is possible to obtain a probability equal to 100% for the transmission-reception coincidence (zones P in dashes in FIGS. 4a, 4b, 4c), even if a time phase shift (FIG. 4b) exists between the or each proximity transmitter/receiver 4a, 4b and the portable medium 6 in question that is found in the field of the latter.

The predetermined time t0 and the time t1 of the cycle can be stored in a memory that can comprise the system, for example, in the area of the alarm control unit 3 or of the or of each assembly, said memory being able then to be connected to the main central processing unit or to one of the secondary processing units, the latter then being configured to process these predetermined, thus stored time values t0 and t1.

Figure 1:
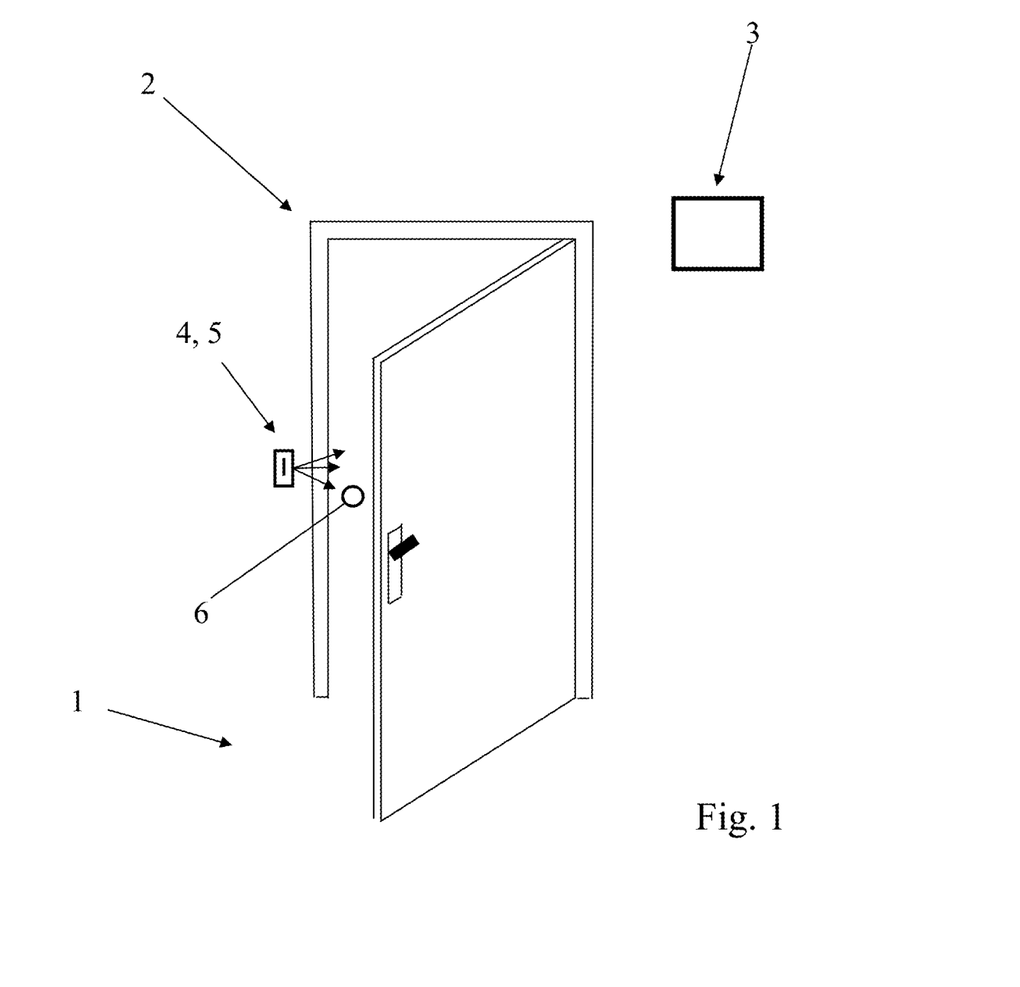
FIG. 1 shows an alarm system, according to this invention, in the first embodiment of the system relating to the activation of the transmitter/receiver of a detection and identification assembly consisting of an autonomous detector/reader installed in the vicinity of an access door of a secure space in a building or a structure, making possible the activation of the proximity transmitter/receiver of the detector/reader autonomously, i.e., without going through the alarm control unit, from said assembly.
Figure 3:
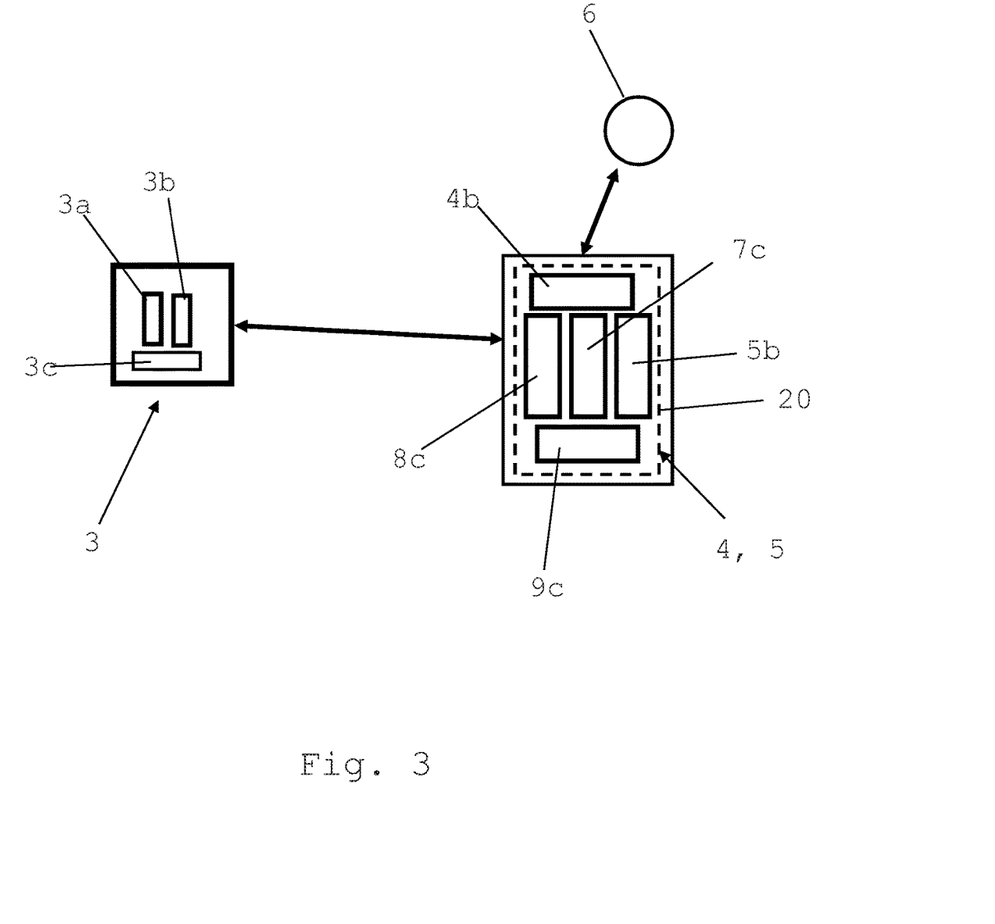
FIG. 3 shows a diagrammatic and functional view of the system according to this invention depicted in FIG. 1.

If reference is made to FIGS. 1 and 3, more particularly to FIG. 3, it can be seen that, in a first embodiment of the system relating to the activation of the transmitter/receiver 4b of the or of each assembly, the or each assembly can consist of an autonomous detector/reader 4, 5 that can incorporate the secondary central processing unit 7c, the secondary communication module 8c, the proximity transmitter/receiver 4b, the detection sensor(s) 5b and the secondary power source 9c. In addition, the secondary central processing unit 7c of the or of each assembly can be designed to be able to control, following a detection by the corresponding detection sensor(s) 5b, the activation of the proximity transmitter/receiver 4b as defined in step b/ i/ of the method in its first embodiment. On the other hand, the main central processing unit 3a of the control unit 3 can be designed to be able to send, via the main communication module 3b and the corresponding secondary communication module 8c, to the secondary central processing unit 7c of the or of each assembly, the information signal representing the state of arming of the control unit 3 as defined in the method in its first embodiment.

It will be understood that in this first embodiment of the system (FIGS. 1 and 3), the or each assembly can thus form an autonomous entity, namely the detector/reader 4, 5. It will also be understood that the secondary central processing unit 7c of the detector/reader 4, 5 of the or of each assembly can be connected operationally to the other constituent elements of the detector/reader 4, 5 with which it is then common, namely, in particular, to the proximity transmitter/receiver 4b, to the secondary communication module 8c, to the detection sensor(s) 5a and to the secondary power source 9a making possible their autonomous power supply.

By an entity will be meant the fact of using the same electronic board 20, or several electronic boards 20 connected to one another incorporating the constituent elements of the detector/reader 4, 5 and/or the same case, not shown, receiving said elements. Thus, in this first embodiment of the system, the detector/reader 4, 5 can comprise a case containing an electronic board 20, if applicable a plurality of electronic boards 20 connected to one another, incorporating the secondary central processing unit 7c, the secondary communication module 8c, the transmitter/receiver 4b, the detection sensor(s) 5b and the secondary power source 9c. In contrast with the first embodiment of the system where the reader 4 and the detector 5 can be incorporated respectively into two separate cases, in the second embodiment, the reader 4 and the detector 5 can be incorporated into the same case.

Figure 2:
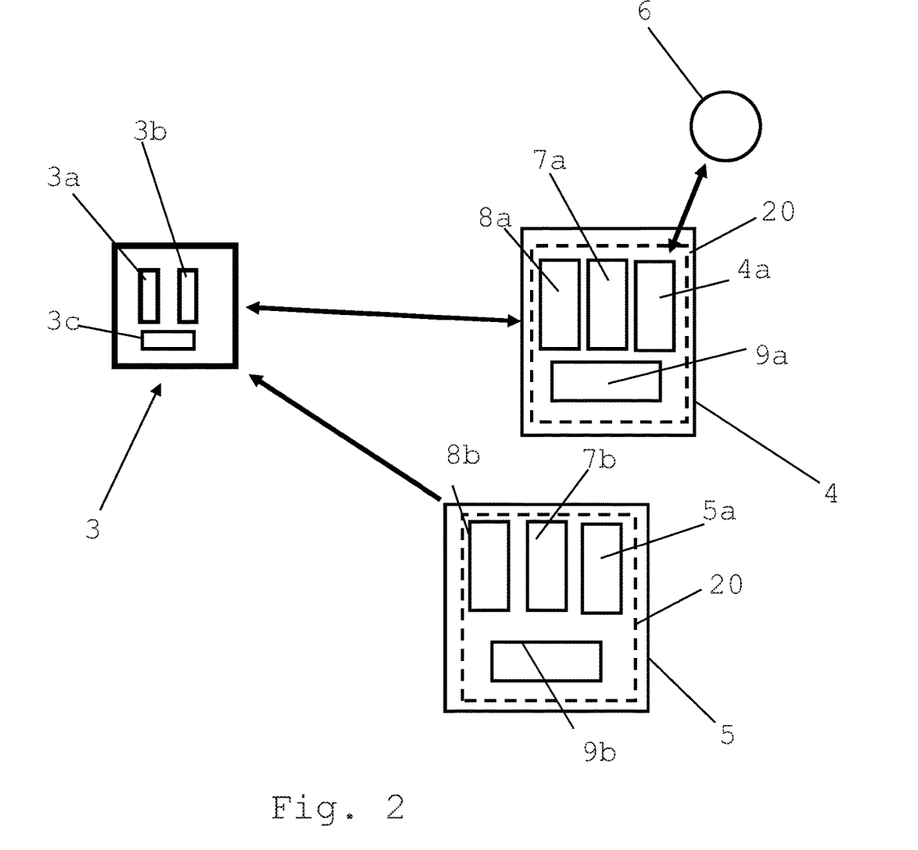
FIG. 2 shows a diagrammatic and functional view of the system according to this invention, in the second embodiment of the system relating to the activation of the transmitter/receiver of a detection and identification assembly consisting of an autonomous reader and an autonomous detector, making possible the activation of the proximity transmitter/receiver of the reader in a centralized way from the alarm control unit.

If reference is now made to FIG. 2, it can be seen that in a second embodiment of the system relating to the activation of the proximity transmitter/receiver 4a of the or of each assembly, the or each assembly can consist, on the one hand, of an autonomous reader 4 that can incorporate the proximity transmitter/receiver 4a, one of the two secondary central processing units 7a, one of the two secondary communication modules 8a, the latter being able to be bidirectional, and one of the two secondary power sources 9a and, on the other hand, of an autonomous detector 5 that can incorporate the other communication module 8b, the detection sensor(s) 5a, the other power source 9b, and the other secondary central processing unit 7b configured to be able to send to the control unit 3, i.e., via the corresponding secondary communication module 8b and the main communication module 3b, the signal representing the detection as defined in step a/ of the method in its second embodiment. Furthermore, the main central processing unit 3a of the control unit 3 can be configured to be able to control, via the main communication module 3b and the corresponding secondary communication module 8a, the activation of the proximity transmitter/receiver 4a, as defined in step b/ i/ of the method in its second embodiment.

It will be understood that in this second embodiment of the system (FIG. 2) relating to the activation of the proximity transmitter/receiver 4a of the or of each assembly, the or each assembly can thus form two autonomous entities, namely the reader 4 and the detector 5 and that the or each assembly can comprise a proximity transmitter/receiver 4a incorporated into the reader 4, two secondary central processing units 7a, 7b, one 7a of which is incorporated into the reader 4 and the other 7b into the detector 5, at least one detection sensor 5a incorporated into the detector 5, two secondary power sources 9a, 9b, one 9a of which is incorporated into the reader 4 and the other 9b into the detector 5, and two secondary communication modules 8a, 8b, one 8a of which is incorporated into the reader 4 and the other 8b into the detector 5. It will also be understood that the secondary central processing unit 7a of the reader 4 or of each assembly can be connected operationally to the other constituent elements of the reader 4, namely, in particular, to the transmitter/receiver 4a, to the secondary communication module 8a, and to the secondary power source 9a that makes possible their autonomous power supply and that the secondary central processing unit 7b of the detector 5 of the or of each assembly can be connected operationally to the other constituent elements of the detector, namely, in particular, to the detection sensor(s) 5a, to the secondary communication module 8b, and to the secondary power source 9b that makes possible their autonomous power supply.

By two entities will be meant the fact of using, in each entity, the same electronic board, or several electronic boards connected to one another incorporating the constituent elements of the reader 4 or the detector 5 and/or the same case for each entity, not shown, which receives said elements in question. Thus, in this second embodiment, for the or each assembly, the reader 4 can comprise a case containing an electronic board, if applicable a plurality of electronic boards connected to one another, incorporating the transmitter/receiver 4a, one of the two secondary central processing units 7a, one of the two secondary communication modules 8a, and one of the two power sources 9a, and the detector 5 can comprise another case containing an electronic board, if applicable a plurality of electronic boards that are connected to one another, incorporating the other communication module 8b, the detection sensor(s) 5a, the other secondary central processing unit 7b and the other secondary power source 9b.

Moreover, step b/ v/ of the method according to the invention, using the or each assembly configured for the or each detection sensor 5a, 5b to be able to be activated or put in the standby state, can consist in putting the proximity transmitter/receiver 4a, 4b directly or indirectly in the standby state either by acting directly on it, or by acting directly on the or each detection sensor 5a, 5b in question to put the latter in the standby state. It will be understood that in the latter case where the or each detection sensor 5a, 5b is put in the standby state, for example by overriding the detection signal transmitted by the latter, for example by means of the main central processing unit or by means of one and/or the other of the secondary processing units, so that the detection is no longer effective, the proximity transmitter/receiver 4a, 4b in question can no longer be put in the activation state since this activation state is controlled according to the invention every time the detection by the or each sensor in question is effective.

In the prior step as defined in the method and relating to the step for the arming of the control unit 3 in the armed state, the or each activation control circuit 7a, 7b can be configured to send, over a predetermined time using the time-delay circuit(s), an activation order to the reader 4 of the or of each assembly as defined in the method in this regard.

Preferably, in the or each assembly, this invention can provide that the reader 4 can be incorporated into the detector 5, without disturbing or inhibiting the operation of the detector. The reverse, i.e., incorporating the detector into the reader, risks posing an operational problem for the detector that can malfunction, even no longer be able to ensure the detection correctly.

Of course, the invention is not limited to the embodiment described and represented in the accompanying drawings. Modifications remain possible, particularly from the standpoint of the makeup of the various elements or by substitution of equivalent techniques, without thereby going outside of the field of protection of the invention as defined in the claims.

The invention claimed is:

1. A method for detecting, recognizing, and automatic disarming of an alarm control unit for monitoring a secure space comprising at least one access opening that is closed by a door, using an alarm system comprising, on the one hand, the alarm control unit that comprises a main central processing unit and a main communication module and is supplied by an autonomous main power source or by the grid; on the other hand, at least one autonomous detection and identification assembly that is connected operationally to the control unit and that is associated with the door or with one of the doors, the or each assembly comprising one or two secondary central processing units, a proximity transmitter/receiver capable of being activated or put on standby, at least one detection sensor able to detect an opening of the associated door and/or a passage through the latter, one or two secondary communication modules making possible the communication with the control unit and one or two secondary power sources making possible the power autonomy of the or of each assembly; and still on the other hand, at least one active wireless communication portable medium comprising a wireless communication chip, such as a Bluetooth chip preferably of low power, and a memory containing an identifier, the or each activated proximity transmitter/receiver being able to establish a wireless communication with the or each chip to make possible the identification of the portable medium and the recognition of its identifier by the control unit that is designed, depending on whether the identifier is recognized or not, automatically to be disarmed or to trigger an alarm procedure, the method, based on a configuration where the or each proximity transmitter/receiver is in the standby state and where the control unit is in the armed or disarmed state, for the or each door in question, comprising performing the following consecutive steps a/ and b/:

a/ automatically detecting, using the detection sensor(s), an opening of the door and/or a passage through the the door, b/ following said detection, depending on the arming state, armed or disarmed, of the control unit:

in the armed state:

i/ controlling the activation of the proximity transmitter/receiver in question to put the proximity transmitter/receiver automatically in the activated state enabling it to communicate wirelessly with the portable medium in question over a predetermined time t0, ii/ in the presence of the portable medium or of one of the portable media in the radio frequency communication field of the activated proximity transmitter/receiver, establishing the corresponding wireless communication to make possible the identification of the portable medium in question, iii/ transmitting the identifier of the portable medium that is thus present to the control unit that, depending on the recognition status of the identifier, performs either, when it is valid, the procedure for disarming the system or, in the absence of a valid identifier, the alarm procedure, optionally after an entry timing delay, iv/ in the absence of a recognized portable medium, controlling, at the expiration of the predetermined time t0, the deactivation of the thus activated proximity transmitter/receiver to put the proximity transmitter/receiver automatically in the standby state, in the disarmed state:

v/ automatically keeping the proximity transmitter/receiver in the standby state by acting directly or indirectly on the proximity transmitter/receiver.

2. The method according to claim 1, wherein, based on the system where, on the one hand, the or each assembly comprises a detector/reader incorporating the secondary central processing unit, the secondary wireless communication module, the proximity transmitter/receiver, the detection sensor(s) and the secondary power source, the secondary central processing unit of the or of each assembly being designed to be able to control, following a detection by the detection sensor(s), the activation of the proximity transmitter/receiver of the same assembly and, on the other hand, the main central processing unit of the control unit is designed to send to the secondary central processing unit of the or of each assembly an information signal representing or reflecting the arming state, armed or disarmed, of the control unit, the method comprising:
prior to step b/, sending, to the secondary central processing unit of the or of each detector/reader, the information signal representing the arming state of the control unit to inform the secondary central processing unit of the arming state of the control unit,
in step b/ i/, controlling from the secondary central processing unit the activation of the proximity transmitter/receiver.

3. The method according to claim 1, wherein, based on the system where the main central processing unit of the control unit is designed to be able to control the activation of the proximity transmitter/receiver of the or of each assembly and where the or each assembly comprises, on the one hand, of a reader incorporating the proximity transmitter/receiver, one of the two secondary central processing units, one of the two secondary communication modules and one of the two secondary power sources and, on the other hand, a detector incorporating the other secondary central unit, the other secondary communication module, the detection sensor(s) and the other secondary power source, the method comprising:
in step a/, sending to the control unit, from the detector, a signal representing the detection performed by the detection sensor(s) of said detector,
in step b/ i/, controlling, from the control unit, the activation of the proximity transmitter/receiver.

4. The method according to claim 1, which comprises in step b/ iv/, controlling the deactivation of the proximity transmitter/receiver from the or one of the secondary central processing units of the same assembly.

5. The method according to claim 1, wherein the control unit comprises a memory containing the list of valid identifiers relative to the portable media and wherein the method comprises controlling, using the system, in response to the arming of the control unit in the armed state, prior to step a/, the activation of the proximity transmitter/receiver of the or of each assembly, automatically to put the or each proximity transmitter/receiver in the activated state during a predetermined time so as to detect the possible presence of a portable medium that is authorized in the secure space, then in controlling, after a predetermined time, the deactivation of the or of each activated proximity transmitter/receiver to a standby state, and in the case of such a presence, temporarily suppressing the portable medium in the list of valid identifiers stored in the control unit until it is next disarmed.

6. The method according to claim 1, wherein, in the armed state and in the activated state of the or of each proximity transmitter/receiver, using the or each portable medium designed to transmit periodically, according to a predetermined timing with a cycle of time t1, a signaling message indicating its presence, said signaling message being transmitted for each cycle on one or more transmitting channels each repeating said message, preferably three channels, the use of the or of each transmitting channel by the or each proximity transmitter/receiver being performed over the predetermined time t0, the method comprising:
defining the predetermined time t0 of the activated state of the or of each proximity transmitter/receiver in relation to the time t1 of the cycle so that the predetermined time t0 is strictly greater than the time t1 of the cycle.

7. The method according to claim 6, wherein, in the case where the signaling message is transmitted on at least two transmitting channels that are used consecutively in a predetermined order by the or each proximity transmitter/receiver and where no communication has been established in the first transmitting channel used, the method comprises using consecutively the other transmitting channel(s) until a communication is established or until the last transmitting channel has been used by the or each proximity transmitter/receiver.

8. The method according to claim 6, wherein the timing is defined so that the time t1 of the cycle is greater than 0.7 second and less than 5 seconds.

9. The method according to claim 6, wherein the timing is defined so that the time t1 of the cycle is greater than 1.5 second and less than 3 seconds.

10. The method according to claim 1, wherein step b/ v/, using the or each assembly configured for the or each detection sensor to be able to be activated or put in the standby state, the method comprises putting the proximity transmitter/receiver directly or indirectly in the standby state either by acting directly on the proximity transmitter/receiver, or by acting directly on the or each detection sensor in question to put the detection sensor in the standby state.

11. An alarm system, suitable for using the method according to claim 1, for identifying, recognizing, and automatic disarming of an alarm control unit, for monitoring a secure space comprising at least one access opening that is closed by a door, wherein the system comprises:
the alarm control unit that comprises a main central processing unit and a main communication module and is supplied by an autonomous main power source or by the grid,
at least one autonomous detection and identification assembly that is connected operationally to the control unit and that is associated with the door or with one of the doors, the or each assembly comprising one or two secondary central processing units, a proximity transmitter/receiver capable of being activated or put on standby, at least one detection sensor able to detect an opening of the associated door and/or a passage through the latter, if applicable the or each detection sensor being capable of being automatically activated or put on standby, one or two secondary communication modules making possible the communication with the control unit and one or two secondary power sources making possible the power autonomy of the or of each assembly,
at least one active wireless communication portable medium comprising a wireless communication chip, such as a Bluetooth chip preferably of low power, and a memory containing an identifier, the or each activated proximity transmitter/receiver being able to establish a wireless communication with the or each communication chip to make possible the identification of the portable medium and the recognition of its identifier by the control unit that is designed, depending on whether the identifier is recognized or not, automatically to be disarmed or to trigger an alarm procedure, and wherein the control unit or, if applicable, the or each assembly, is designed, following the detection by the detection sensor(s), on the one hand, in the armed state of the control unit, automatically to make it possible to control the activation of the proximity transmitter/receiver in question, as defined in step b/ i/, and, on the other hand, in the disarmed state of the control unit, automatically to make it possible to keep, as defined in step b/ v/, the or each proximity transmitter/receiver in the standby state by acting directly or indirectly on the latter, and the or each assembly comprises time-delay means that make possible to control automatically, after the predetermined time t0, the deactivation as defined in step b/ iv/.

12. The system according to claim 11, wherein the or each assembly comprises an autonomous detector/reader incorporating the secondary central processing unit, the secondary communication module, the proximity transmitter/receiver, the detection sensor(s) and the secondary power source, wherein the secondary central processing unit of the or of each assembly is designed to be able to control, following a detection by the detection sensor(s), the activation of the proximity transmitter/receiver and wherein the main central processing unit of the control unit is designed to be able to send, via the main communication module and the corresponding secondary communication module, to the secondary central processing unit of the or of each assembly an information signal representing or reflecting the arming state, armed or disarmed, of the control unit.

13. The system according to claim 12, wherein the detector/reader comprises a case containing an electronic board, if applicable a plurality of electronic boards connected to one another, incorporating the secondary central processing unit, the secondary communication module, the proximity transmitter/receiver, the detection sensor(s) and the secondary power source.

14. The system according to claim 11, wherein the or each assembly comprises, on the one hand, an autonomous reader incorporating the proximity transmitter/receiver, one of the two secondary central processing units, one of the two secondary communication modules which are bidirectional, and one of the two secondary power sources and, on the other hand, an autonomous detector incorporating the other communication module, the detection sensor(s), the other secondary power source and the other secondary central processing unit configured to be able to send to the control unit the signal representing the detection as defined in step a/, and wherein the main central processing unit is configured to be able to control, via the main communication module and the corresponding secondary communication module, the activation of the proximity transmitter/receiver, as defined in step b/ i/.

15. The system according to claim 14, wherein, for the or each assembly, the reader comprises a case containing an electronic board, if applicable a plurality of electronic boards connected to one another, incorporating the proximity transmitter/receiver, one of the two secondary central processing units, one of the two secondary communication modules, and one of the two power sources, and wherein the detector comprises a case containing an electronic board, if applicable a plurality of electronic boards that are connected to one another, incorporating the other communication module, the detection sensor(s), the other secondary central processing unit, and the other secondary power source.

\* \* \* \* \*